United States Patent [19]

Hawk

[11] Patent Number: 4,696,149
[45] Date of Patent: Sep. 29, 1987

[54] AQUATIC WEED CONTROL METHOD AND APPARATUS

[76] Inventor: James L. Hawk, 22435 SE. 288th, Kent, Wash. 98031

[21] Appl. No.: 780,919

[22] Filed: Sep. 27, 1985

[51] Int. Cl.$^4$ .......................................... A01D 44/00
[52] U.S. Cl. ................................................ 56/8; 37/71
[58] Field of Search ............... 56/8, 9, DIG. 2; 37/54, 37/55, 57, 71

[56] References Cited

U.S. PATENT DOCUMENTS

| | | | |
|---|---|---|---|
| 57,856 | 9/1866 | Byrne | 37/54 |
| 575,272 | 1/1897 | Pottel | 37/54 |
| 1,839,380 | 1/1932 | Druppel | 56/8 |
| 2,486,275 | 10/1949 | Grinwald | 37/71 |
| 2,737,769 | 3/1956 | Donald | 56/8 |
| 3,238,708 | 3/1966 | Zickefoose | 56/8 |
| 3,407,577 | 10/1968 | Fiske | 56/8 |
| 3,477,213 | 11/1969 | Just et al. | 56/8 |
| 3,653,192 | 4/1972 | Bryant | 56/9 |
| 3,765,156 | 10/1973 | Porter | 56/8 |
| 4,248,033 | 2/1981 | Bryant | 56/8 |
| 4,416,106 | 11/1983 | Hawk | 56/8 |

FOREIGN PATENT DOCUMENTS

| | | | |
|---|---|---|---|
| 1132804 | 10/1982 | Canada | 56/8 |
| 995304 | 6/1965 | United Kingdom | 37/57 |
| 2073568 | 10/1981 | United Kingdom | 56/8 |

OTHER PUBLICATIONS

"A Review of Mechanical Devices . . . Water Milfoil in British Columbia", Information Bulletin, vol. IV, pp. 2-17, Oct., 1978.

*Primary Examiner*—Gene Mancene
*Assistant Examiner*—John G. Weiss
*Attorney, Agent, or Firm*—Christensen, O'Connor, Johnson & Kindness

[57] ABSTRACT

Unwanted aquatic weeds are removed by first dragging the bottom of a lake with a horizontal bar to loosen the weeds from the bottom. The uprooted and broken weed stalks are permitted to float to the surface of the lake. The weeds are scooped from the water by a mesh scoop capable of being carried to a dumping area and emptied. The method is carried out by a self-propelled hull having a boom pivotally attached to a forward end thereof. The boom is adapted to receive various implements on its free end. One such implement is a horizontal drag bar with downwardly depending tines to drag the lake bottom and another of the implements is the wire mesh scoop mentioned above. The tines of the first implement each preferably include at least a portion that is angled forwardly, so that when the boom is lowered sufficiently to meet the lake bottom the angled portion of the tine if substantially orthogonal to the lake bottom. The tines preferably are at least partially embedded in the bottom and loosen the root systems of deeply-rooted aquatic weeds. The scoop is pivotally mounted on the boom so that it can be moved by gravity to a dump position that permits gravity to act on the weed stalks and empty the scoop.

4 Claims, 6 Drawing Figures

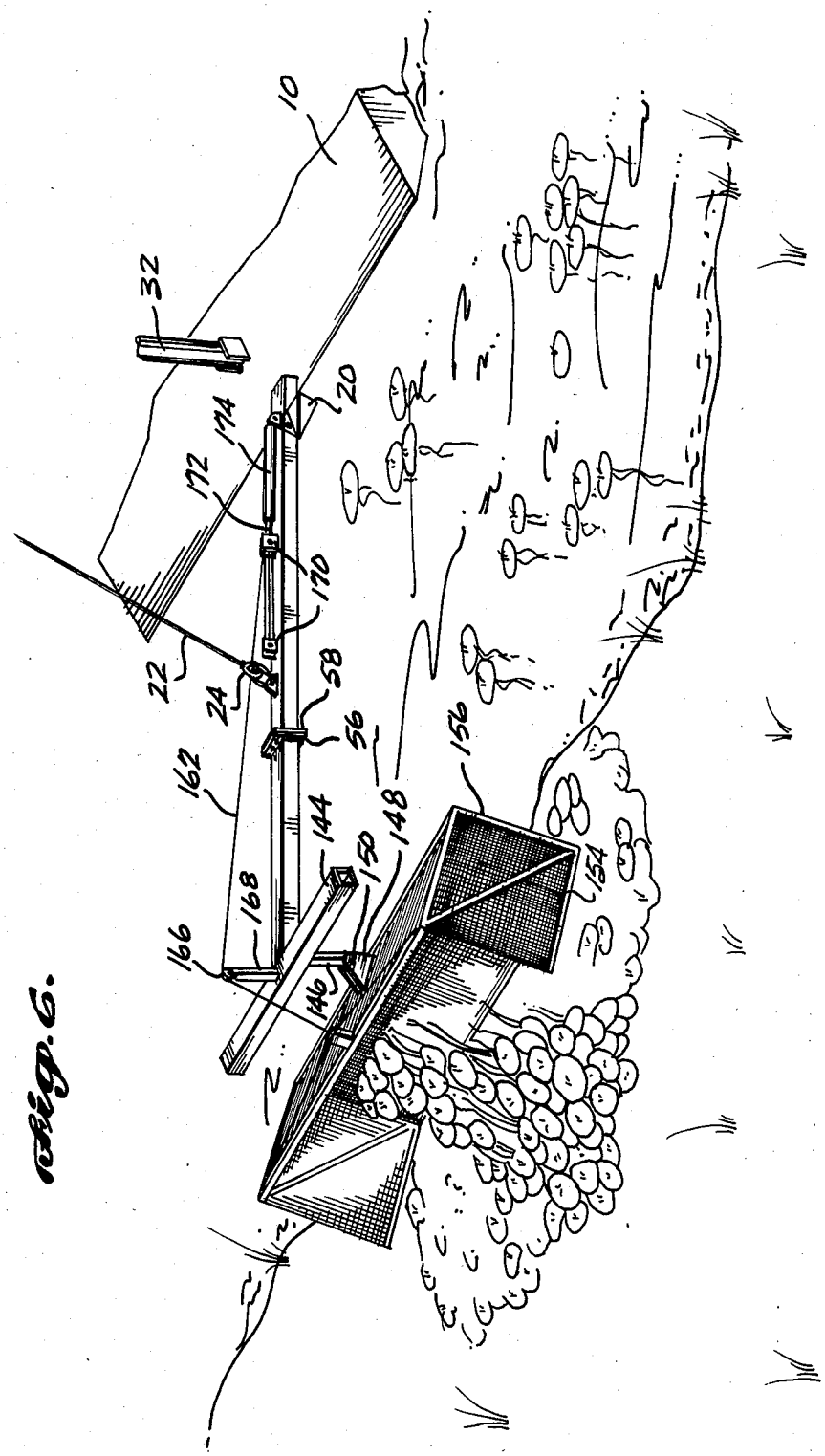

AQUATIC WEED CONTROL METHOD AND APPARATUS

BACKGROUND OF THE INVENTION

This invention relates to the removal of unwanted aquatic weeds, such as water lilies and milfoil from lakes and similar bodies of water, and, more particularly, relates to an apparatus and a method of removing the aquatic weeds in a manner to diminish their regrowth and to conveniently dispose of the weeds once they are removed from the aquatic environment.

There are an increasing number of lakes, both in the United States and other parts of the world, that have been infested with an aquatic weed known as "Eurasian Milfoil". This weed grows rapidly in freshwater lakes and makes them unsuitable for water-skiing or boating. In smaller lakes, the infestation can reach such proportions that the milfoil actually chokes off all other life in the lake and destroys the lake. Several herbicides have been found useful in combatting the milfoil, as well as other aquatic weeds; however, certain of them are unsuitable for use in recreational lakes because of the harmful effect on fish and other aquatic life.

Most prior attempts at mechanical elimination or at least reduction of the weed levels in freshwater lakes have been directed toward cutting the weeds at a point below the surface of the water but leaving the roots intact, much like mowing a lawn. While these methods provide for an immediate decrease in the weed level and an increase in the usefulness of the lake, the weeds grow back and, in much the same manner as mowing a lawn, the weeds seem to grow back at a faster rate than they would have without the mowing. Also by complete removal of the weeds from the lake the phosphate and nitrate levels of the water are reduced, which in turn slows the rate of weed and algae growth.

U.S. Pat. No. 4,416,106 describes a method and apparatus of weed removal that has a more permanent, or at least longer lasting effect on the weed population of a given body of water, that involves actually removing roots of the plants rather than simply mowing the plants back to an innocuous length. While the method and apparatus described in U.S. Pat. No. 4,416,106 have proved to be successful and viable for weed removal, it is desired to provide a more mechanically simple apparatus to accomplish essentially the same purpose and, also, to provide for the easy removal from the lake of the uprooted weed stalks with a single vehicle.

SUMMARY OF THE INVENTION

To further the objectives stated above, the present invention provides a relatively simple apparatus for the mechanical removal of noxious weeds from a body of water. The invention includes a self-propelled hull having mounted thereon, in cantilever fashion, a boom that is pivotally mounted to be raised and lowered in and out of the water. The outboard end of the boom is adapted to receive implements suitable for weed removal and gathering. One such implement includes a transverse bar depending from a crossbeam affixed to the end of an elongate boom section. The bar is dragged through the muck at the bottom of the lake to loosen weed roots in the muck and mud. For deep-rooted weeds the transverse bar has a plurality of tines or prongs depending downwardly therefrom. As the boom is placed in its lowered position, the prongs actually embed themselves into the muck and mire at the bottom of a body of water, such that when the hull is propelled, the bar and tines are dragged through the muck, removing the deep roots of any plant life growing from the lake bottom. At the same time, the transverse bar engages the weed stalks rising from the bottom and either breaks the stalks off or drags the stalks along with their uprooted root systems until such time as the stalks float to the surface of the water.

The above-noted apparatus is used in conjunction with another implement fitted to the end of the pivotable boom comprising a wire mesh scoop that is positioned partially submerged below the surface of the water, such that when the hull is propelled forwardly the scoop moves through the water. The water passes through the wire mesh of the scoop, but any material floating in the water, such as the broken and uprooted weed stalks, is gathered by the mesh scoop. Once the scoop is filled, the hull is propelled to the shore or to a waiting pickup barge where the boom is raised and the scoop, which is pivotally mounted on the boom, is dumped to empty the uprooted weed stalks from the scoop onto a storage pile. If the shoreline permits access by truck to the water line, it would be possible to dump the screen or wire mesh scoop directly into the bed of a truck for easy removal of the weed stalks from the shore to a suitable dump site.

In an alternate method of weed removal, in which it is desired to rapidly remove the weeds from a navigable channel in a lake, it is possible to simply lower the mesh scoop beneath the surface of the water and maneuver the scoop forwardly through the water by propulsion of the hull, catching weeds and stalks, for example, water lilies, in the scoop and tearing them from their root system as the scoop moves through the lily pads. As before, once the scoop is filled with water lilies or other weeds, the hull can be propelled to the dumping site and the severed weed stalks dumped into a suitable storage or dumping receptacle.

BRIEF DESCRIPTION OF THE DRAWINGS

The advantages and operation of the invention will be better understood by those of ordinary skill in the art and others upon reading the ensuing specification when taken in conjunction with the appended drawings, wherein:

FIG. 6 is an isometric view of the scoop of FIG. 5 in the dump position, emptying a load of water lilies whose stalks have been severed from their roots.

DETAILED DESCRIPTION OF THE PREFERRED EMBODIMENT

Figure 1:
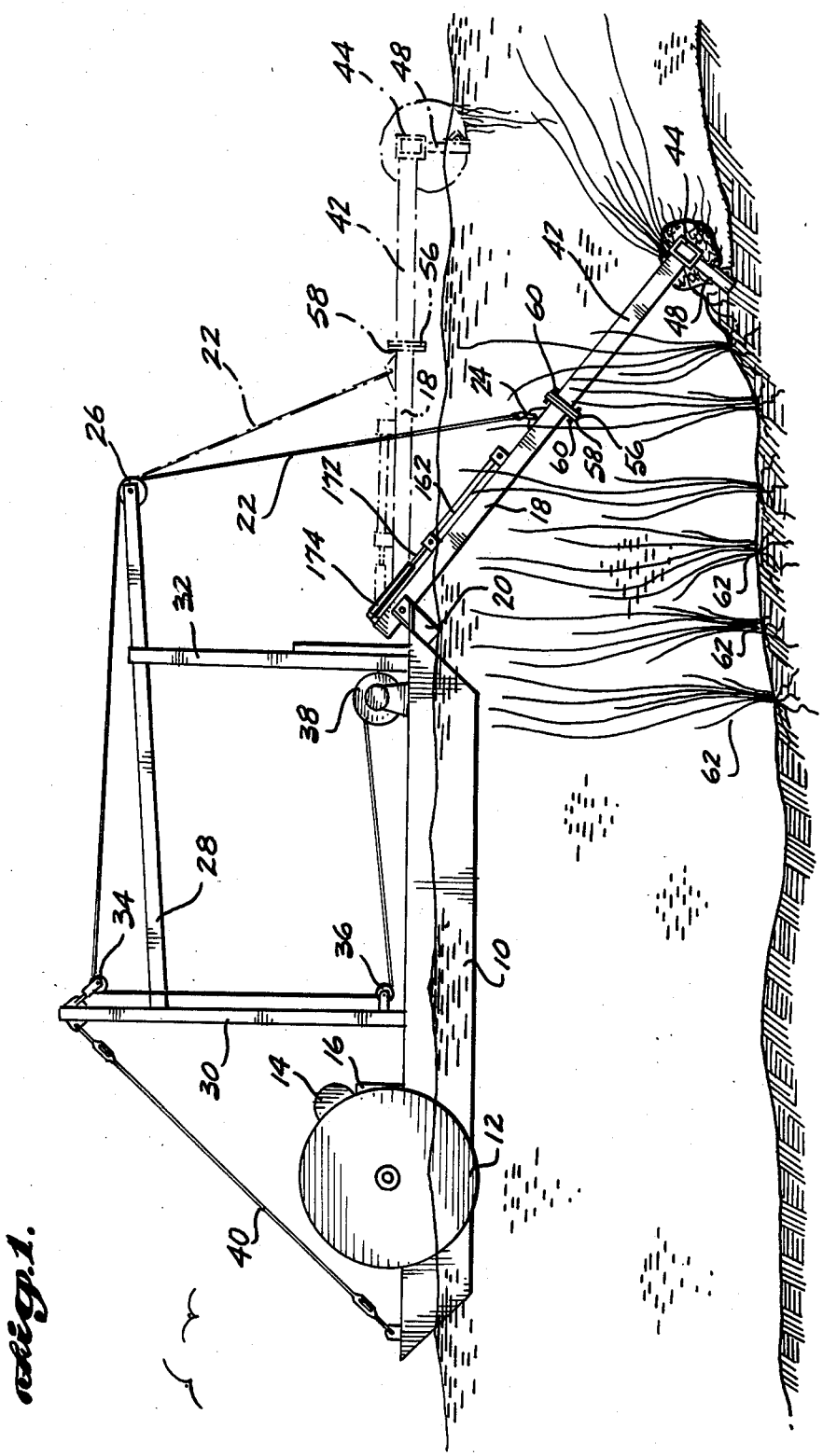
FIG. 1 is a side elevational view of one embodiment of a weed removal apparatus, made in accordance with the principles of the present invention, engaging a lake bottom.

FIG. 1 illustrates one embodiment of a weed removal apparatus made in accordance with the principles of the present invention in operation on a lake or other body of water. A forward portion of the apparatus of FIG. 1 is shown in isometric view in FIG. 2. The apparatus includes a floating hull 10 that is propelled by a suitable propulsion means, for example, a paddlewheel 12, located at the aft portion of the hull. A cooperating paddlewheel is located on the opposite side of the hull 10 but is not visible in the illustrations. The paddlewheels can be driven by any suitable power source. In a preferred embodiment, it has been found that a hydraulic paddlewheel, operated by high-pressure hydraulic fluid from a hydraulic pump 14 that, in turn, is powered by a diesel engine 16, works very well, particularly in allowing independent operation of one or the other of the paddlewheels to aid in maneuverability of the hull. At the forward end of the hull 10 a main boom 18 is pivotally attached at a first end thereof to a bracket 20 mounted at the forward end of the hull 10. The second end of the main boom 18 has a first end of a cable 22 attached to it by means of a mounting ring 24. The cable 22 extends upwardly from the boom to and over a pulley 26 rotatably attached to a first end of a substantially horizontally oriented rigging boom 28. The rigging boom is affixed at an aft end thereof to a mainmast 30 and the rigging boom is supported intermediate its first and second ends by a forward mast 32 that rises vertically from the forward end of the hull 10. The cable 22 continues to extend from the pulley 26 to and over an aft pulley 34 mounted from an upper end of the mainmast 30. From the aft pulley 34, the cable 22 runs down to a third pulley 36 mounted on a lower end of the mainmast 30. The cable 22 runs over the pulley 36 and then coils about the spool of a winch 38 mounted on the deck of the hull 10. The mainmast 30 is supported by a guy wire 40 that runs from an aft end of the hull 10 to an uppermost end of the mainmast.

Figure 3:
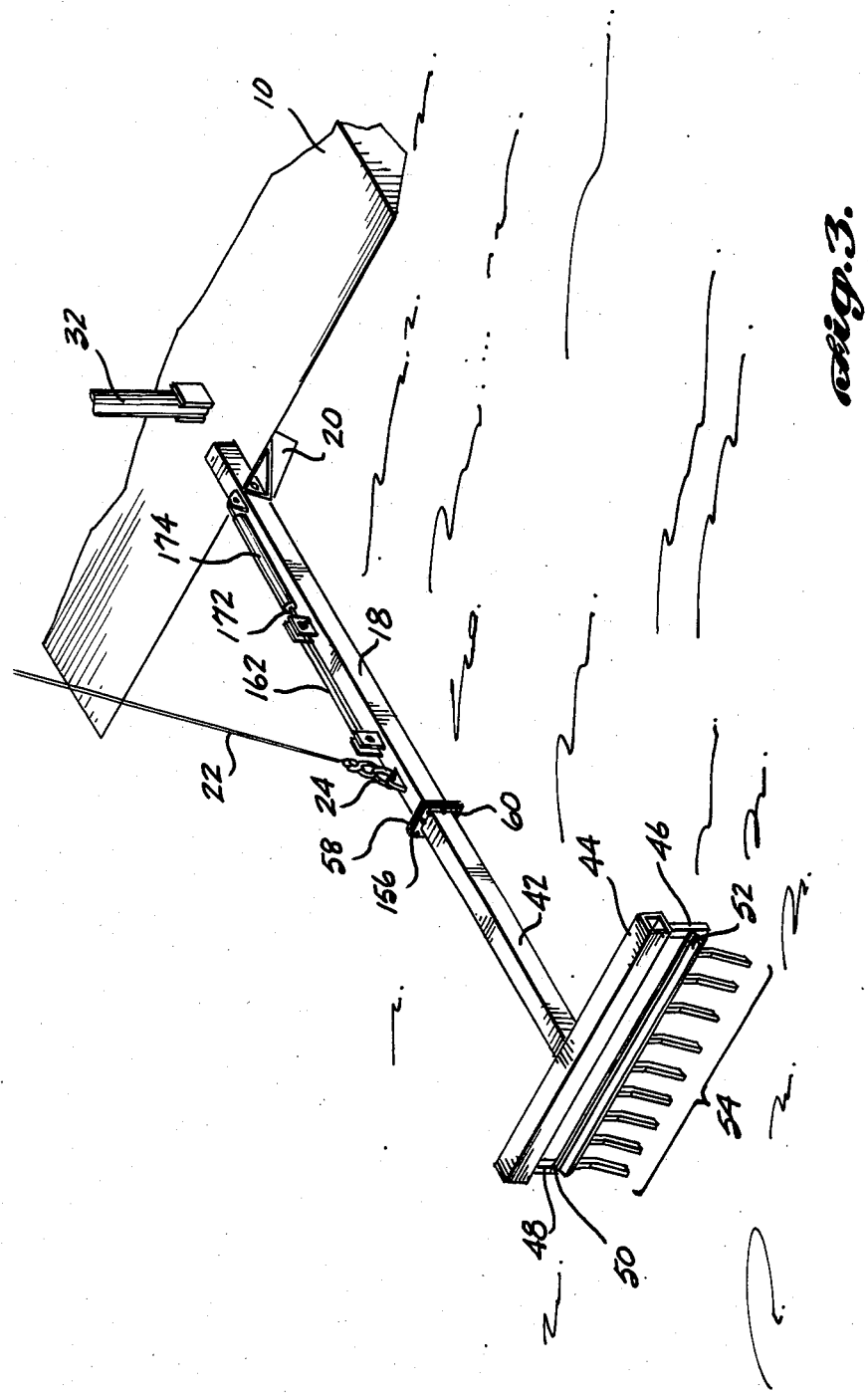
FIG. 3 is an isometric view of one embodiment of a weed removal boom made in accordance with the principles of the present invention.

By operation of the winch 38, the length of the cable 22 is varied to raise and lower the main boom 18 about its pivot on the bracket 20. The forward or second end of the main boom 18 has attached thereto a rake drag bar apparatus comprising an extension boom 42 having affixed to it a transversely oriented support bar 44 to form a "T" shape as best illustrated in FIG. 3. First and second ends of the support bar 44 have depending therefrom rake supports 46 and 48, respectively, the lower ends of the rake supports 46 and 48 being connected by a weed-engaging bar 50. The weed-engaging bar 50 has an angle iron affixed to the forward side of the bar for stiffening. The boom extension 42 has a flange plate 56 attached to a rearward end thereof, which mates with a flange plate 58 mounted on the forward end of the main boom 18. The two flange plates are affixed to their respective boom sections, such as by welding, and then are held together to connect the boom extension 42 to the main boom 18 by fasteners, such as bolts 60.

As viewed in FIG. 1 the boom 18 is lowered sufficiently to cause the weed-engaging bar 50 to engage the bottom 51 of a lake or other body of water. As the hull 10 is propelled to the left the bar 50 drags through the mud and muck of the lake bottom, sometimes to a depth of six or more inches, loosening the root systems of the aquatic plants and causing the plants to uproot and float free in the water. At times the force of the support bar 44 on the weed stalks will break the stalks from roots that are not sufficiently loosened so that the stalks will float free in the water separated from their roots.

Figure 2:
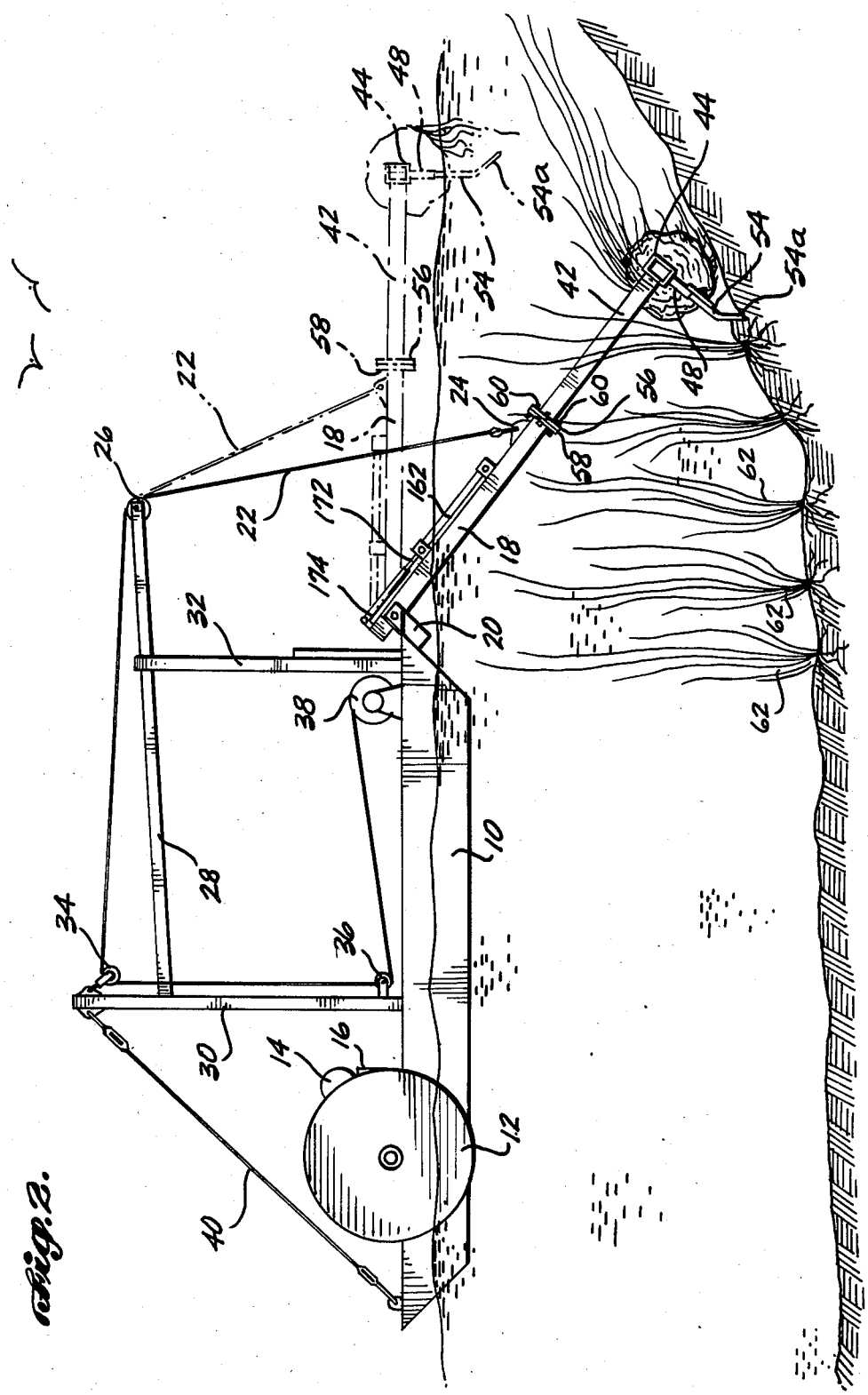
FIG. 2 is a side elevational view of a second embodiment of a weed removal apparatus, made in accordance with the principles of the present invention, engaging a lake bottom.

Some aquatic weeds are rooted very deeply in the bottom and are not able to be loosened by the weed-engaging bar 50. For such deep-rooted weeds the weed-engaging bar 50 is provided with a plurality of downwardly depending tines 54 affixed to the underside of the weed-engaging bar 50 as shown in FIGS. 2 and 3. Preferably the tines 54 have a forwardly bent portion 54a at their lowermost end. The operation of the tined implement is similar to that described above. The boom sections 18 and 42 are pivoted down into the water such that the tines 54, and, particularly, the forwardly bent portions 54a, embed themselves into the bottom of a lake. The hull 10 is then propelled in a direction from right to left as viewed in FIG. 2, dragging the tines through the lake bottom, loosening the root systems of the weeds 62 growing from the bottom of the lake. The weed-engaging bar 50 as well as the support bar 44 engage the weed stalks and either break the stalks of the weeds or carry the weed stalk and loosened root system away as the hull moves through the water. It has been found that the majority of the weed stalks broken off or removed from the bottom will engage the weed-engaging bar and support bar for a short time and then work themselves free and float to the surface of the water for later removal. The forward angle of the lower portion 54a of the tines is designed to compensate for the angle of the boom portions 18 and 42 as the boom reaches the bottom to provide an approximately vertical orientation, of at least a portion of the tine, with the lake bottom at varying water depths. It has been found that an angle of 15 to 20 degrees for the forwardly angled portion 54a of the tines is satisfactory with a boom length of approximately 14 feet from the hull to the rake section. The downward angle of the boom can be varied to compensate for the varying depth of the lake or the body of water and some weed removal occurs even if the tines do not embed themselves in the lake bottom, due to the breaking of the stalks and tearing of some of the more loosely rooted stalks from the lake bottom just by engagement of the weed stalks with the weed-engaging bar 50. However, the most effective weed removal for deep-rooted weeds has been found when the tines 54 actually dig into the lake bottom to act as uprooting agents.

Figure 4:
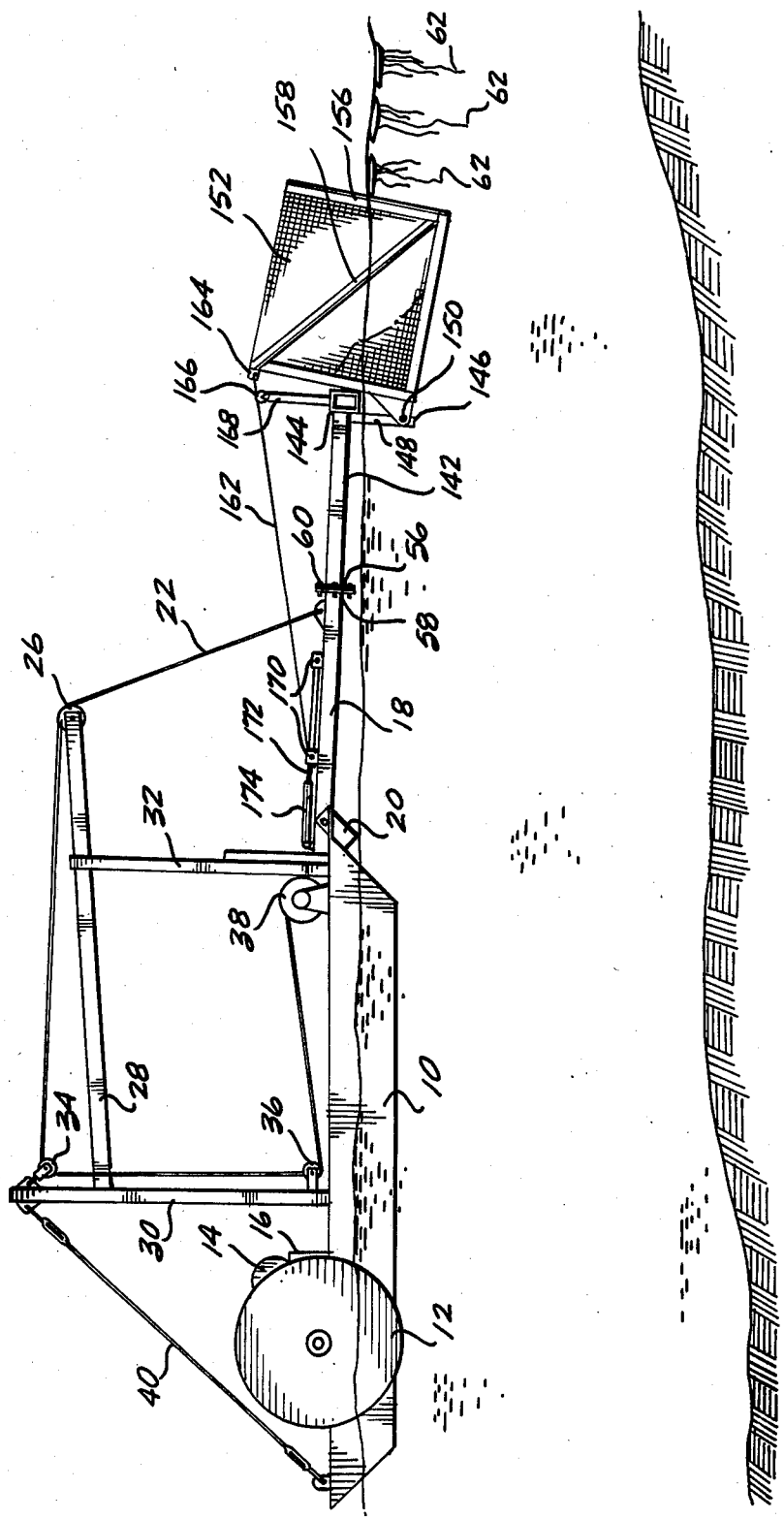
FIG. 4 is a side elevational view of one embodiment of a weed scoop, made in accordance with the principles of the present invention, engaging severed aquatic weeds floating in the water.
Figure 5:
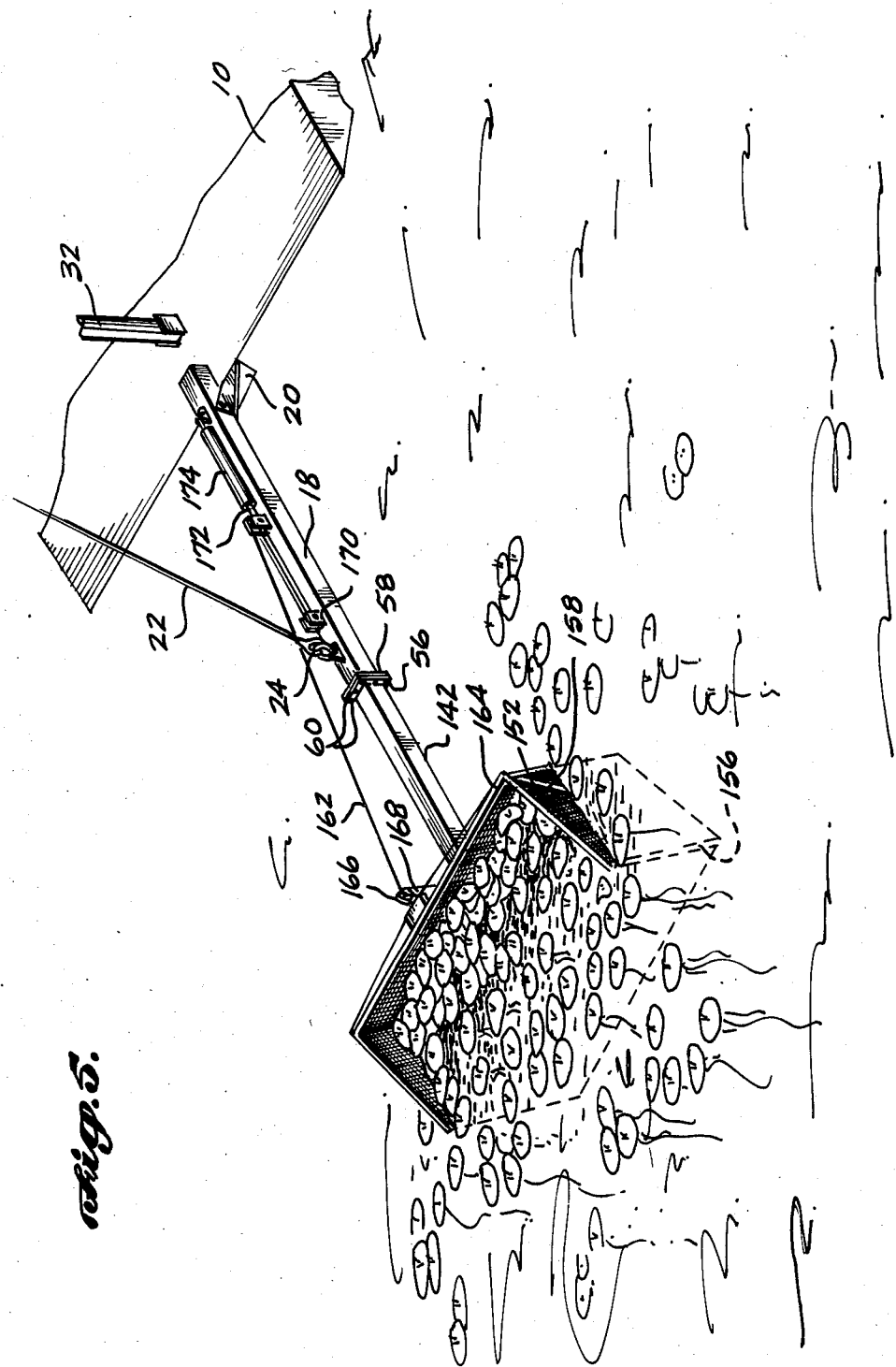
FIG. 5 is an isometric view of the forward section of the weed scoop of FIG. 4 working its way through an infestation of water lilies.

Once the weeds have been dislodged from the lake bottom, it is necessary to collect the weed stalks and remove them to shore or otherwise dispose of them, since the majority of noxious aquatic weeds tend to reroot themselves from the broken stalk if left in the water. Also, the use of the water for recreational purposes is not greatly enhanced by simply uprooting the weeds and leaving them floating in the water; therefore, the removal of the weeds from the water after uprooting is an essential ingredient in the successful reclamation of a weed-infested lake. The design of the main boom shown in FIGS. 1 and 2 is such that it permits the relatively simple attachment of various useful implements to the main boom portion 18 to convert the hull from one purpose to another. For example, by unbolting the bolts 60 that hold the boom extension arm 42 to the main boom 18, an alternative boom extension arm 142, such as illustrated in FIGS. 4, 5, and 6, can be attached to the main boom section 18 to convert the hull 10 from use as a strictly weed removal apparatus to a weed collection apparatus. Referring to FIG. 4, the second boom extension 142 is attached to the main boom 18 by means of bolts 60 that attach a flange plate 156 affixed to the first end of the second boom extension to the flange plate 58. The second end of the second boom extension 142 has a second support bar 144 affixed to it in transverse orientation forming a "T" shape with the second boom extension 142. A scoop-mounting bar 146 depends downwardly from the boom extension 142 at its junction with the second support bar 144. A clevis 148 is attached by a pivot pin 150 to the scoop-mounting bar 146. The clevis 148 is affixed to the lower central portion of a wire mesh scoop 152. The wire mesh scoop 152 includes first and second side panels 152a and 152b, connected by a bottom panel 152c, and a back panel 152d, to form a rectangular box with two open faces. A plurality of framing members 154 are arranged to outline the sides of the scoop 152 for rigidity of the basket and a diagonal frame member 156 is mounted on each side of the basket, again, to increase the rigidity of the scoop. The scoop is free to pivot about the pin 150 from the upright position shown in FIGS. 4 and 5, to the dumping position, shown in FIG. 6. Movement of the basket is controlled by a cable 162 attached at a first end thereof to the scoop at a bracket 164 mounted to the upper central portion of the rear wall of the scoop. The cable 162 runs over a pulley 166 rotatably mounted at the upper end of a spacer support 168 vertically mounted on the upper surface of the second support bar 144. The cable runs rearwardly to a block-and-tackle arrangement 170 that consists of a series of pulleys over which the cable runs to produce what is known in the art as a "six-part line", meaning that the pulleys increase the effective movement of the cable as it exits the block from the inputted motion at the input side of the block. The input side of the block and tackle 170 is attached to the forward end of a piston 172 slidably mounted within a hydraulic cylinder 174. By moving the piston in and out of the hydraulic cylinder 174, the effective length of the cable 162 with respect to the end of the boom is changed, such that when the piston is in its inwardmost relationship to the cylinder 174 the tension on the cable 162 maintains the basket in an upright position. When the piston 172 is moved forwardly by the hydraulic fluid within the cylinder 147, the line 162 slackens and the weight of the basket rotates the basket about the pivot pin 150 into the dumping position shown in FIG. 5.

In operation, the weed scoop can be used in two different modes. As shown in FIG. 4, with the boom in a position such that the basket 152 is partially submerged, the basket collects severed weeds as it moves through the water. The hull 10 can be propelled to scoop the severed weed stalks 62 floating in the water and collect them in the basket 152. The water will flow through the basket because of the mesh nature of the basket sides and back; however, the weeds will be trapped. When the weeds are all accounted for or when the basket is filled to capacity, the hull can be propelled to a dumping location, either onshore or on a barge, in the case of a large body of water, and the scoop operated to the dumping position, as shown in FIG. 5, to dump the weeds or other contents of the basket. The use of the six-part line allows a minimum of linear movement of the piston 172 to effectuate a large enough slack in the cable 162 to allow the basket to dump. Since the piston can move the relatively short amount necessary in a short amount of time, the dumping action is very quick, jarring the contents of the basket out very effectively. Alternatively, the scoop can be used as shown in FIG. 5 to work through a section of water containing weeds, such as water lilies still attached to the bottom, literally ripping the water lilies from their root systems, and then immediately collecting them in the basket for dumping. This method has been found to be very effective in quickly opening up water channels for small boats in a lake otherwise clogged by water-borne weeds, particularly water lilies.

In summary, therefore, a method of removing aquatic weeds by first dragging the bottom with a bar to loosen the roots of the weeds and then allowing the weeds to float to the surface after being removed from the bottom, followed by the step of scooping the weeds from the water with a mesh scoop capable of being carried to a convenient dumping place and unloaded, is carried out by a self-propelled hull having a boom pivotally mounted on a forward end thereof adapted for relatively simple attachment of various implements to the boom. In one embodiment the implement comprises an extension boom having a rake-like structure attached to the forward end thereof consisting of a crossbar and a series of downwardly projecting tines. Preferably, at least a portion of each of the tines is forwardly angled to compensate for the downward angle of the boom when the tines are placed on the bottom to provide the tines with a substantially vertical orientation with respect to the bottom. Another implement usable on the boom is a pivotable scoop assembly comprising a boom extension having a mesh basket attached thereto, pivotable between an upright scooping position and a dumping position. The basket can be moved through the water under propulsion of the hull to scoop the severed weeds floating in the water and then moved to a dumping location where the mesh basket can be quickly pivoted forward to allow the weeds and other matter to exit the basket under the force of gravity.

While the preferred embodiments of the invention have been illustrated and described herein, it should be understood by those of ordinary skill and others that changes can be made to the illustrated embodiments, while remaining within the scope of the present invention. For example, the precise angle of the tines can be empirically calculated depending on the depth of the water and length of the boom being utilized. Also, while a four-sided rectangular box structure is illustrated for the mesh scoop of the present invention, it would be possible to utilize other shapes having an open forward face. Further, while a barge having a paddlewheel propulsion is shown, other types of propulsion could be used as well as other means of mechanically controlling the motion of both the boom and the scoop basket. Therefore, the invention should be defined solely with reference to the claims that follow.

The embodiments of the invention in which an exclusive property or privilege is claimed are defined as follows:

1. An apparatus for removing aquatic plants from a body of water comprising:
   a floating hull;
   an elongate boom pivotally attached at a first end thereof to a forward end of said hull;
   rigging means associated with said hull and said boom for raising and lowering said boom about said point of pivotal attachment of said boom to said hull;
   a first implement for mounting on a second end of said boom, said first implement including a drag bar oriented transversely to said boom;

implement-mounting means associated with the second end of said boom constructed and arranged to removably connect an implement to said boom;

a second implement, said second implement constructed and arranged for attachment to said boom by said implement-mounting means in the absence of said first implement, said second implement including a scoop of foraminous material, one side of said scoop being open to receive weeds and a second side closed to provide resistance to said weeds to keep them in said scoop, said second implement further including an auxiliary boom in line with said elongate boom, a first end of said auxiliary boom being adapted to be connected to said elongate boom by said implement-mounting means and a second end of said auxiliary boom having said scoop pivotally mounted thereto, said scoop being movable between the normal position and a dumping position; and pivot control means associated with said elongate boom and said scoop and operable to move said scoop between said normal and dumping positions, said pivot control means including a cable attached at a first end thereof to said scoop and a second end of the cable being attached to a block and tackle, said block and tackle being associated with a hydraulic actuator mounted on said elongate boom such that the input side of said block and tackle is connected to one end of a piston movably mounted in said hydraulic actuator, said actuator and said block and tackle cooperably connected such that a movement of one unit of linear measure by said piston is amplified by said block and tackle to cause a movement of greater than one measuring unit by said first end of said cable.

2. The apparatus of claim 1, further including propulsion means mounted on said hull.

3. The apparatus of claim 2, wherein said propulsion means includes independently operable paddlewheels mounted on each side of said hull.

4. The apparatus of claim 1, wherein said scoop is made of wire mesh and includes a frame holding said wire mesh to said auxiliary boom, said frame providing rigidity to the otherwise flexible wire mesh.

* * * * *